United States Patent
Koo et al.

(10) Patent No.: US 10,567,763 B2
(45) Date of Patent: Feb. 18, 2020

(54) METHOD AND DEVICE FOR PROCESSING A VIDEO SIGNAL BY USING AN ADAPTIVE SEPARABLE GRAPH-BASED TRANSFORM

(71) Applicants: LG Electronics Inc., Seoul (KR); University of Southern California, Los Angeles, CA (US)

(72) Inventors: Moonmo Koo, Seoul (KR); Sehoon Yea, Seoul (KR); Bumshik Lee, Seoul (KR); Amir Said, San Jose, CA (US); Hilmi Enes Egilmez, Los Angeles, CA (US); Antonio Ortega, Los Angeles, CA (US)

(73) Assignees: LG Electronics Inc., Seoul (KR); University of Southern California

(*) Notice: Subject to any disclaimer, the term of this patent is extended or adjusted under 35 U.S.C. 154(b) by 0 days.

(21) Appl. No.: 15/577,029

(22) PCT Filed: May 26, 2016

(86) PCT No.: PCT/KR2016/005599
§ 371 (c)(1),
(2) Date: Nov. 27, 2017

(87) PCT Pub. No.: WO2016/190690
PCT Pub. Date: Dec. 1, 2016

(65) Prior Publication Data
US 2018/0146195 A1 May 24, 2018

Related U.S. Application Data

(60) Provisional application No. 62/166,667, filed on May 26, 2015.

(51) Int. Cl.
*H04N 19/122* (2014.01)
*H04N 19/105* (2014.01)
(Continued)

(52) U.S. Cl.
CPC ......... *H04N 19/122* (2014.11); *H04N 19/105* (2014.11); *H04N 19/176* (2014.11);
(Continued)

(58) Field of Classification Search
CPC ...... H04N 19/60; H04N 19/103; H04N 19/12; H04N 19/14; H04N 19/122; H04N 19/105; H04N 19/109; H04N 19/176
See application file for complete search history.

(56) References Cited

U.S. PATENT DOCUMENTS 5,122,873 A * 6/1992 Golin .................. H04N 5/9262
375/240.23
9,544,597 B1 * 1/2017 Han ................. H04N 19/00781
(Continued)

FOREIGN PATENT DOCUMENTS

KR 10-2011-0135787 12/2011
WO WO-2017065795 A1 * 4/2017 ............. G06F 17/00

OTHER PUBLICATIONS

Kim "Graph-Based Transforms for Depth Video Coding", ICASSP 2012, pp. 813-816. (Year: 2012).*
(Continued)

*Primary Examiner* — Jamie J Atala
*Assistant Examiner* — Michael Robert Cammarata
(74) *Attorney, Agent, or Firm* — Fish & Richardson P.C.

(57) ABSTRACT

A method and a device for decoding a video signal using an adaptive separable graph-based transform. The method includes: receiving a transform index for a target block from the video signal in which the transform index indicates a graph-based transform to be applied to the target block; deriving a graph-based transform kernel corresponding to the transform index; and decoding the target block based on the graph-based transform kernel. The device includes: a parsing unit configured to receive a transform index for a
(Continued)

target block from the video signal; and an inverse-transform unit configured to derive a graph-based transform kernel corresponding to the transform index and decode the target block based on the graph-based transform kernel.

7 Claims, 20 Drawing Sheets

(51) Int. Cl.
    *H04N 19/176* (2014.01)
    *H04N 19/61* (2014.01)
    *H04N 19/625* (2014.01)
    *H04N 19/82* (2014.01)

(52) U.S. Cl.
    CPC ........... *H04N 19/61* (2014.11); *H04N 19/625* (2014.11); *H04N 19/82* (2014.11)

(56) References Cited

U.S. PATENT DOCUMENTS

| | | | | |
|---|---|---|---|---|
| 9,681,128 | B1* | 6/2017 | Han | H04N 19/00569 |
| 9,967,559 | B1* | 5/2018 | Han | H04N 19/00793 |
| 2013/0272422 | A1* | 10/2013 | Lee | H04N 19/176 375/240.18 |
| 2014/0164410 | A1* | 6/2014 | Studer | G06F 17/30371 707/756 |
| 2014/0254674 | A1* | 9/2014 | Lee | H04N 19/105 375/240.12 |
| 2015/0010048 | A1 | 1/2015 | Puri et al. | |
| 2015/0110409 | A1* | 4/2015 | Bultje | H04N 19/13 382/239 |
| 2015/0112897 | A1 | 4/2015 | Wang et al. | |
| 2015/0145874 | A1* | 5/2015 | Han | H04N 19/176 345/506 |
| 2017/0238019 | A1* | 8/2017 | Said | H04N 19/124 375/240.18 |
| 2018/0146195 | A1* | 5/2018 | Koo | H04N 19/122 |
| 2018/0167618 | A1* | 6/2018 | Lee | H04N 19/176 |

OTHER PUBLICATIONS

Shen "Edge-Adaptive Transforms for Efficient Depth Map Coding, 28th Picture Coding Symposium", PCS2010, Dec. 8-10, 2010, Nagoya, Japan, pp. 566-569. (Year: 2010).*

Zhang "Analyzing the Optimality of Predictive Transform Coding Using Graph-Based Models", IEEE Signal Processing Letters, vol. 20, No. 1, Jan. 2013 (Year: 2013).*
Gokhan, "Approximation and Compression With Sparse Orthonormal Transforms", IEEE Transactions on Image Processing, vol. 24, No. 8, Aug. 2015. (Year: 2015).*
Fracastoro, "Graph-based Transform Coding with Application to Image Compression" arXiv:1712.06393v2 [cs.IT] Dec. 28, 2017 (Year: 2017).*
H. E. Egilmez, A. Said, Y. Chao and A. Ortega, "Graph-based transforms for inter predicted video coding," 2015 IEEE International Conference on Image Processing (ICIP), Quebec City, QC, 2015, pp. 3992-3996.doi: 10.1109/ICIP.2015.7351555 (Year: 2015).*
Y. Ye and M. Karczewicz, "Improved h.264 intra coding based on bi-directional intra prediction, directional transform, and adaptive coefficient scanning," 2008 15th IEEE International Conf (Year: 2008).*
Y. Wang, A. Ortega and G. Cheung, "Intra predictive transform coding based on predictive graph transform," 2013 IEEE International Conference on Image Processing, Melbourne, VIC, 2013, pp. 1655-1659.doi: 10.1109/ICIP.2013.6738341 (Year: 2013 ).*
D. Liu and M. Flierl, "Motion-Adaptive Transforms Based on Vertex-Weighted Graphs," 2013 Data Compression Conference, Snowbird, UT, 2013, pp. 181-190.doi: 10.1109/DCC.2013.23 (Year: 2013).*
S. Takamura and A. Shimizu, "On intra coding using mode dependent 2D-KLT," 2013 Picture Coding Symposium (PCS), San Jose, CA, 2013, pp. 137-140.doi: 10.1109/PCS.2013.6737702 (Year: 2013).*
Wang (Y. Wang, A. Ortega and G. Cheung, "Intra predictive transform coding based on predictive graph transform," 2013 IEEE International Conference on Image Processing, Melbourne, VIC, 2013, pp. 1655-1659. doi: 10.1109/ICIP.2013.6738341) (Year: 2013).*
Fracastoro, Predictive graph construction for image compression, 2015 IEEE International Conference on Image Processing (ICIP), Sep. 27-30, 2015 (Year: 2015).*
Chao, Yung-Hsuan, Compression of Signal on Graphs With the Application to Image and Video Coding, A Dissertation Presented to the Faculty of the USC Graduate School University of Southern California in Partial Fulfillment of the Requirements for the Degree, Dec. 2017. (Year: 2017).*
International Search Report in International Application No. PCT/KR20160/005599, dated Aug. 18, 2016, 12 pages (with partial English translation).
Narang et al., "Critically sampled graph-based wavelet transforms for image coding," Oct. 2013, APSIPA, pp. 1-4.
Hu et al., "Multiresolution graph fourier transform for compression of piecewise smooth images," Jan. 2015, IEEE, 24(1):419-433, 17 pages.

* cited by examiner

[FIG. 1]
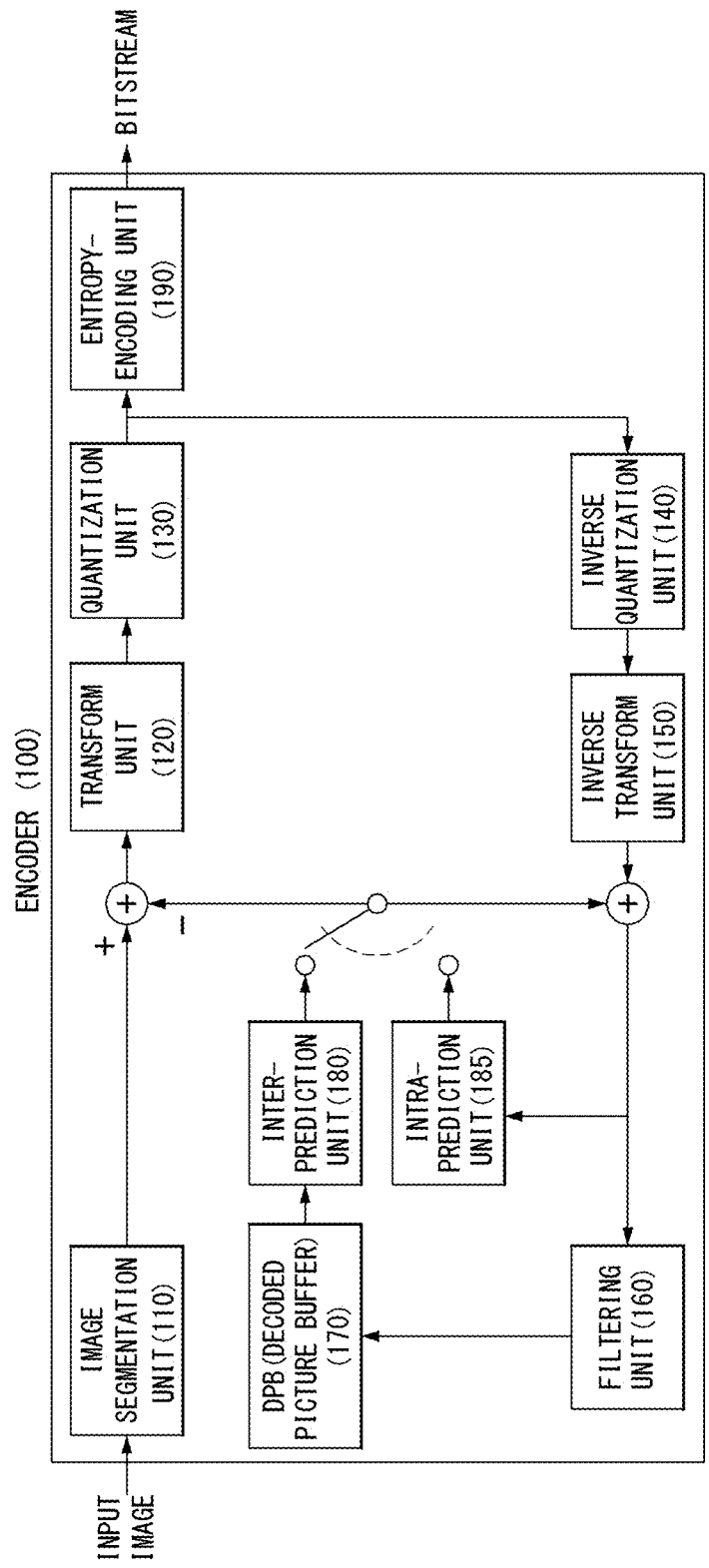

[FIG. 2]
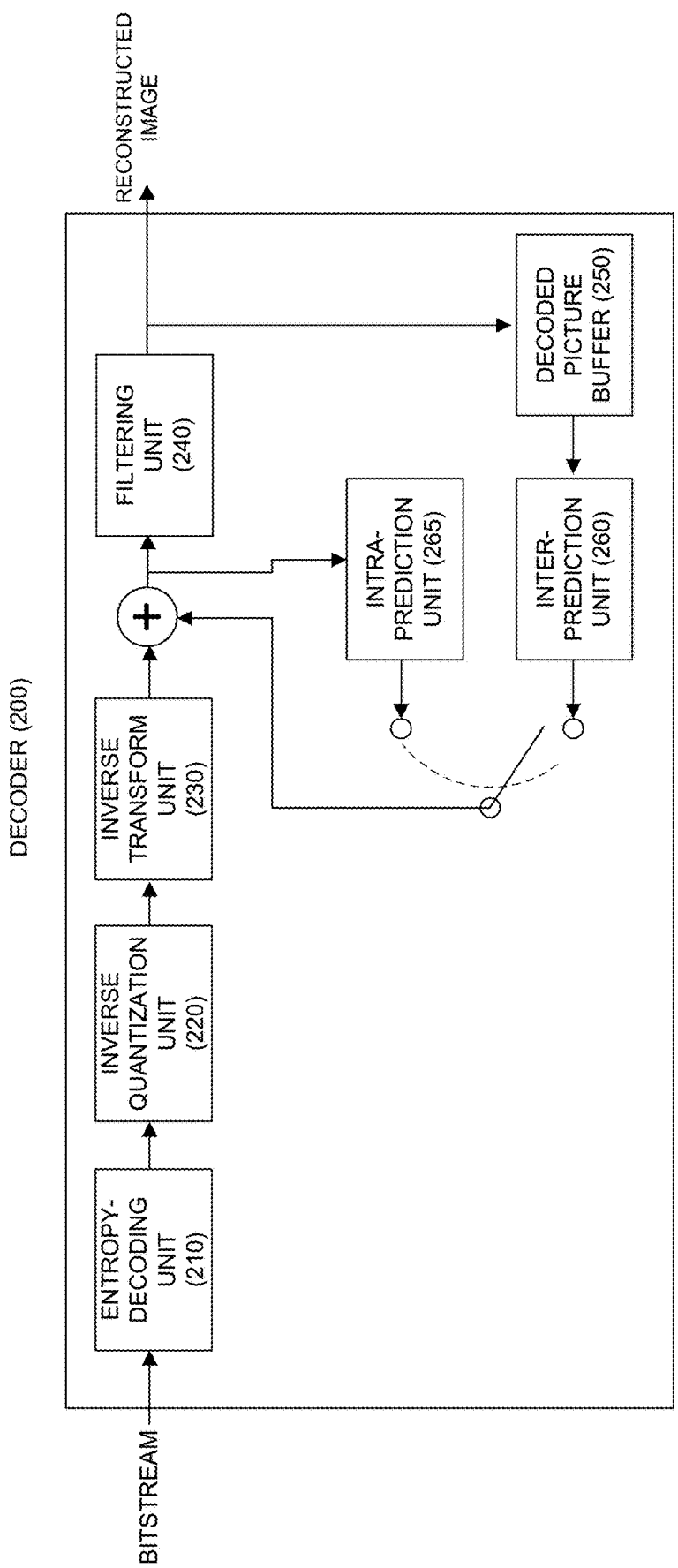

[FIG. 3]
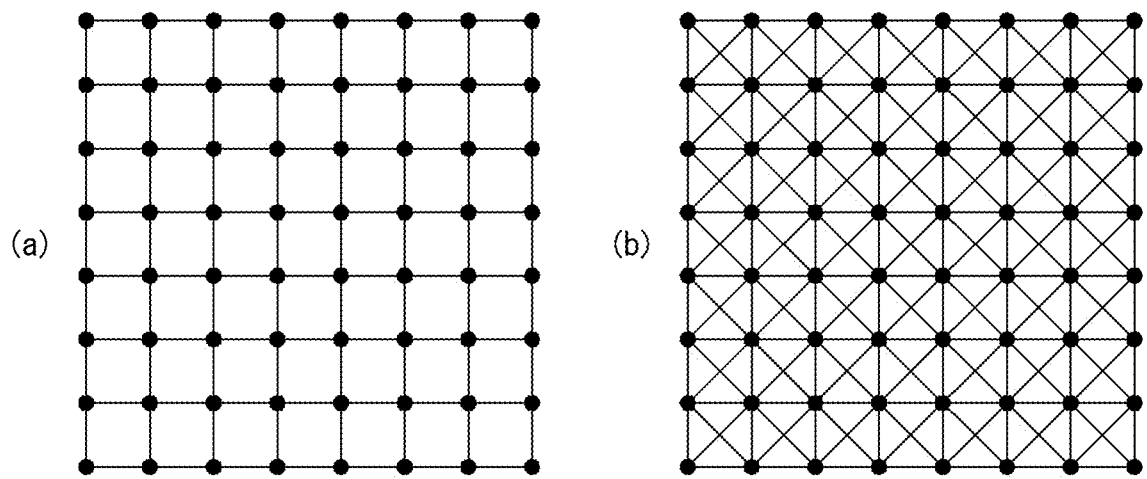
(a)  (b)
[FIG. 4]
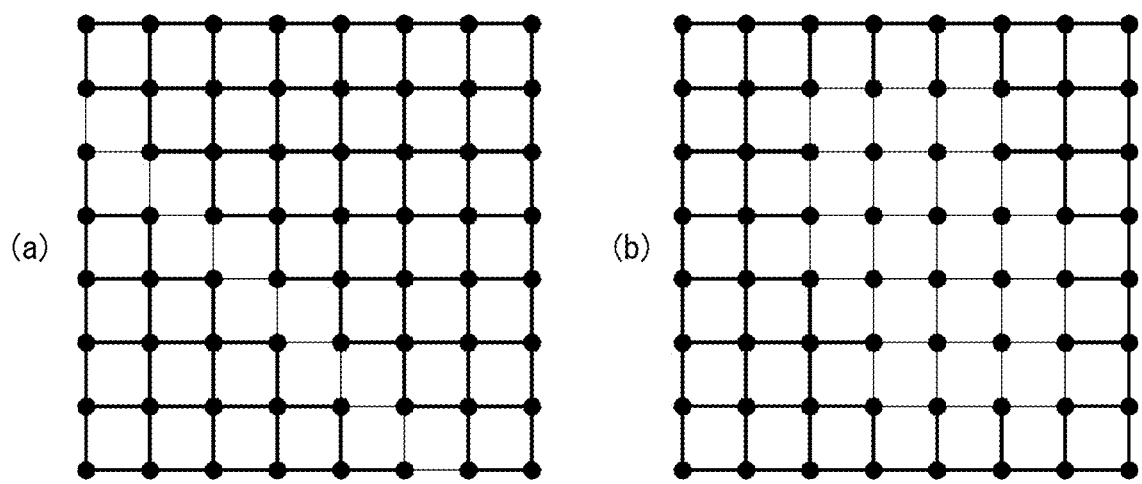
(a)  (b)

[FIG. 5]
(a) 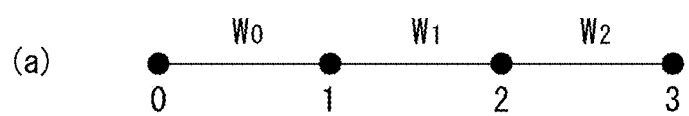
(b) 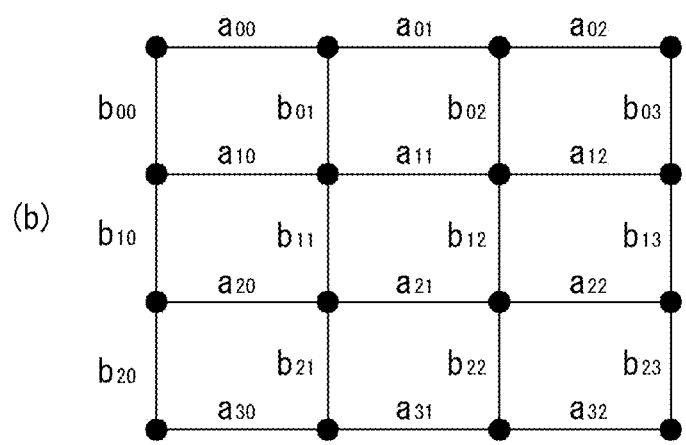

[FIG. 6]
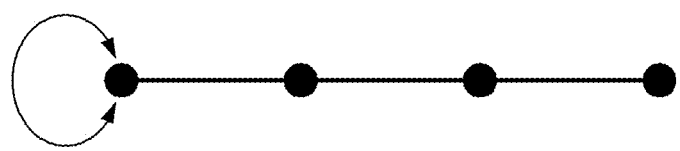
(a)
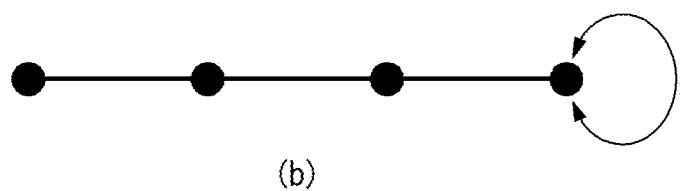
(b)
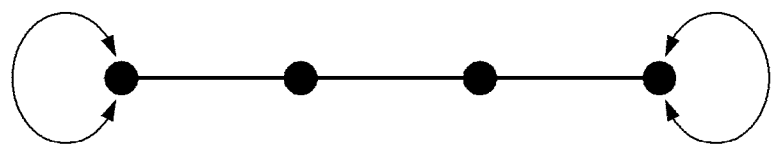
(c)
(d)

[FIG. 7]
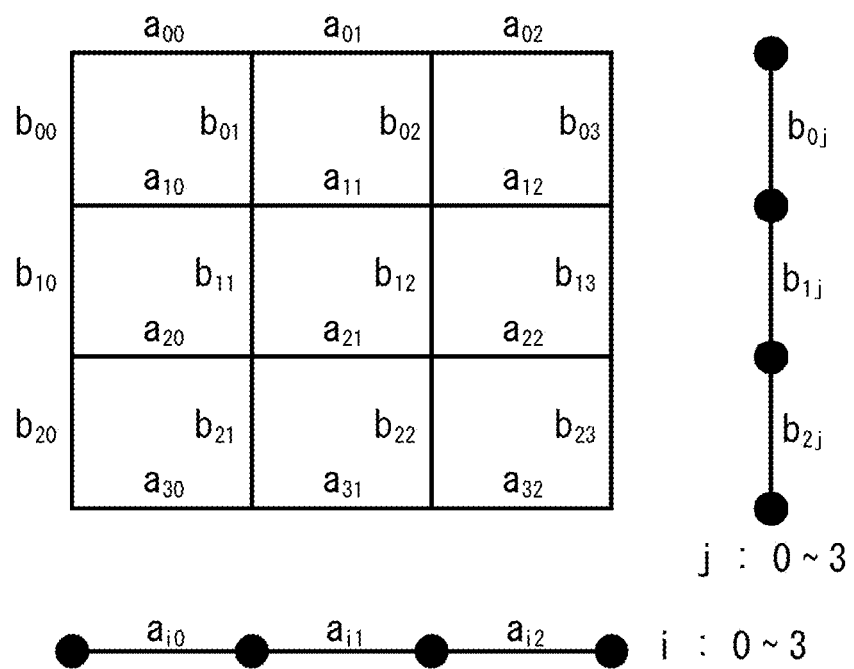

[FIG. 8]
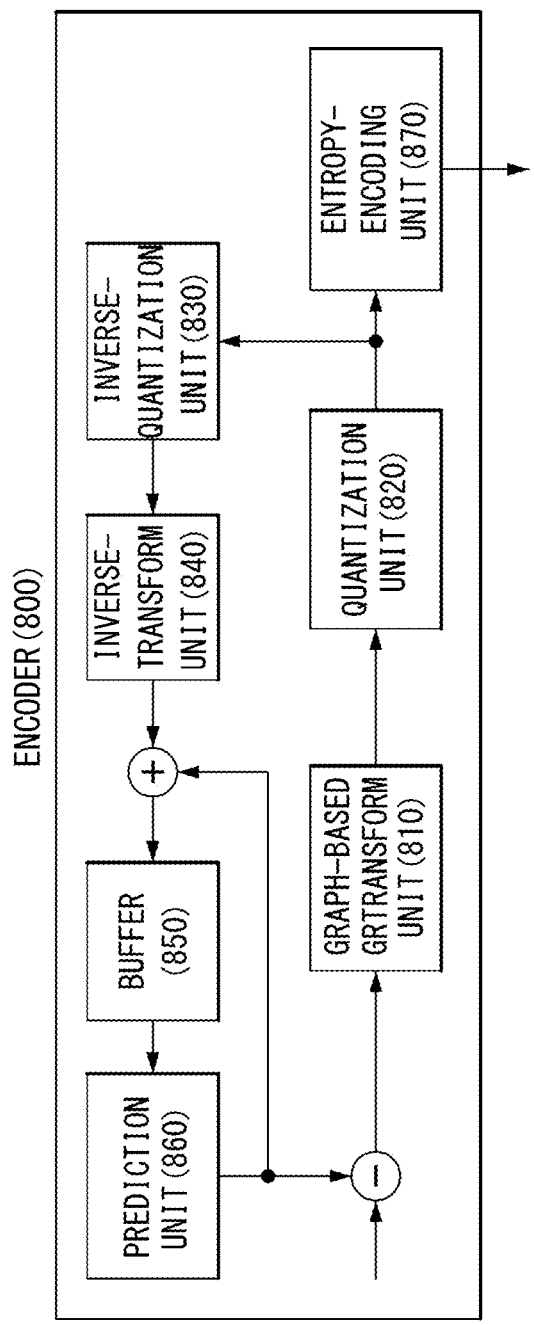

[FIG. 9]
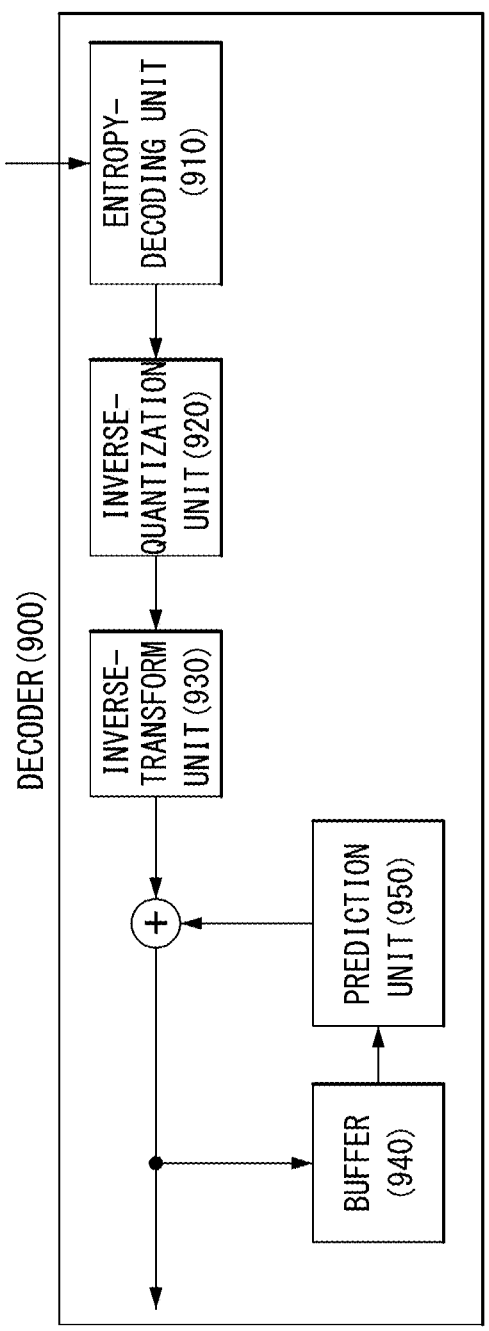

[FIG. 10]
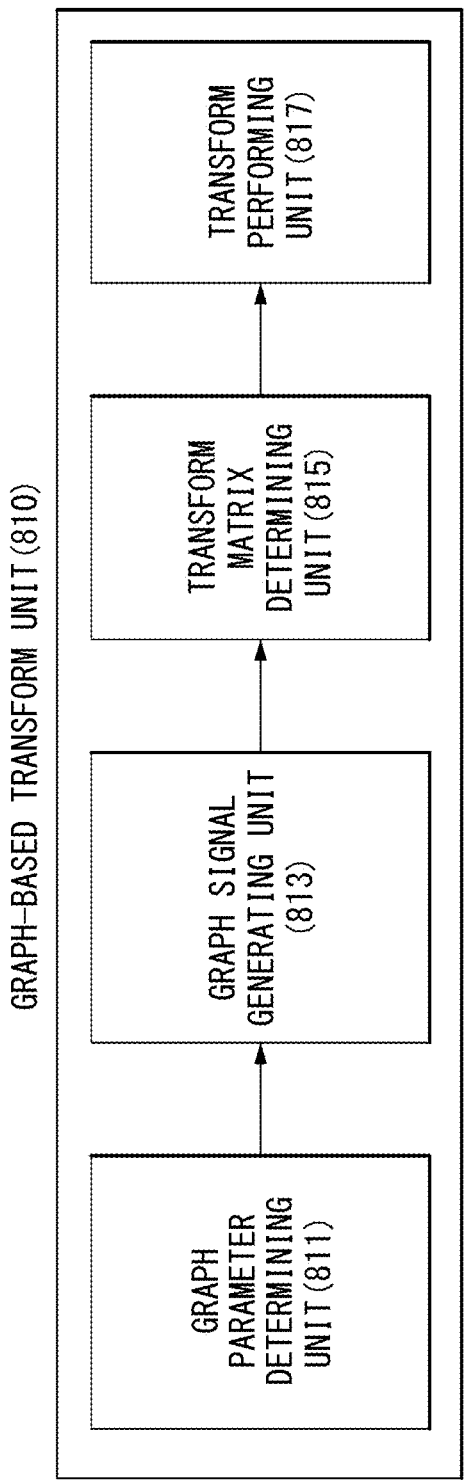

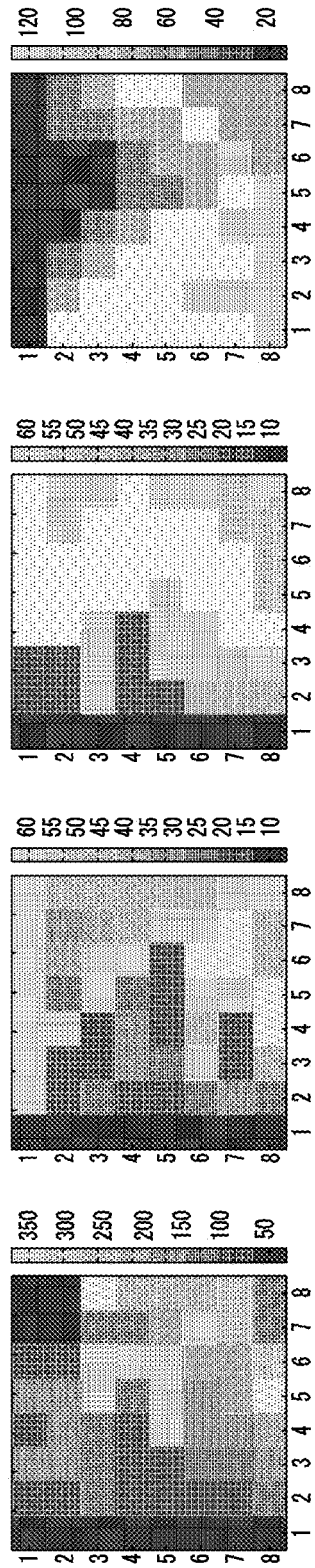
[FIG. 11]

[FIG. 12]
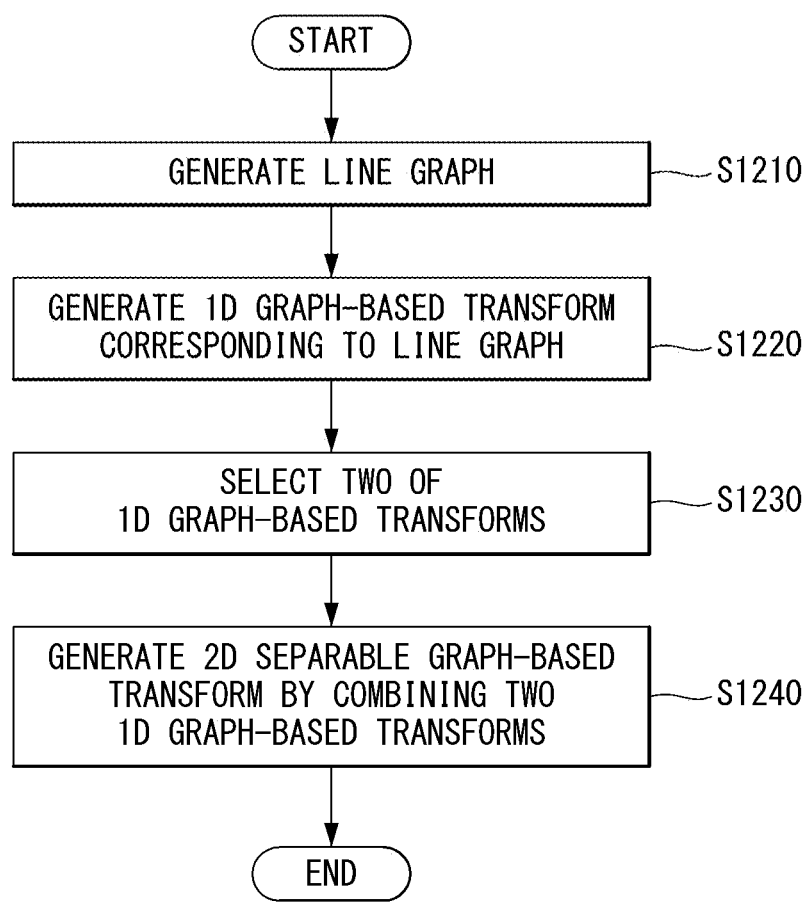

[FIG. 13]

| | Graph type | Edge weights (A) | Self-loop weights (S) | Resulting Transform |
|---|---|---|---|---|
| (a) | Line | uniformly | no-self loops | reparable DCT |
| (b) | Line | uniformly | single self-loop at one end | separable ADST |
| (c) | Line | arbitrary | arbitrary | Generalized separable transform |
| (d) | arbitrary | arbitrary | arbitrary | Non-separable transform |

[FIG. 14]
 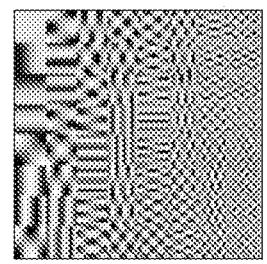
(a) (b)
[FIG. 15]
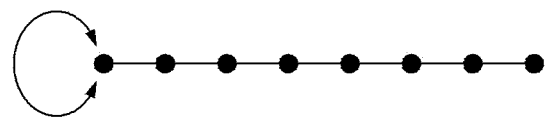 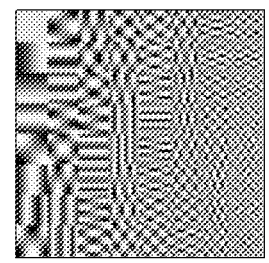
(a) (b)

[FIG. 16]
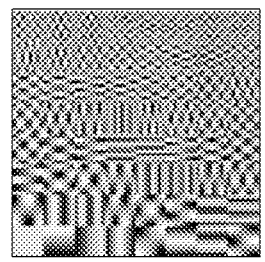
(c)
(b)
(a)

【FIG. 17】
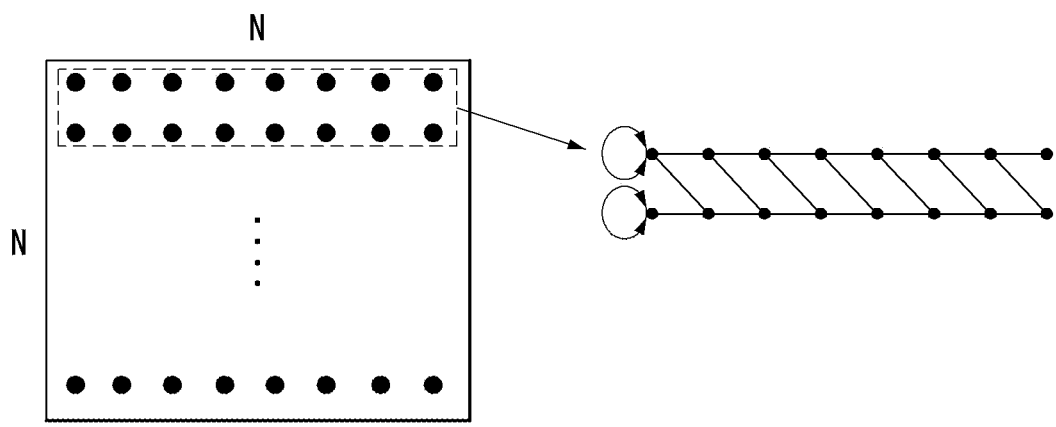
【FIG. 18】
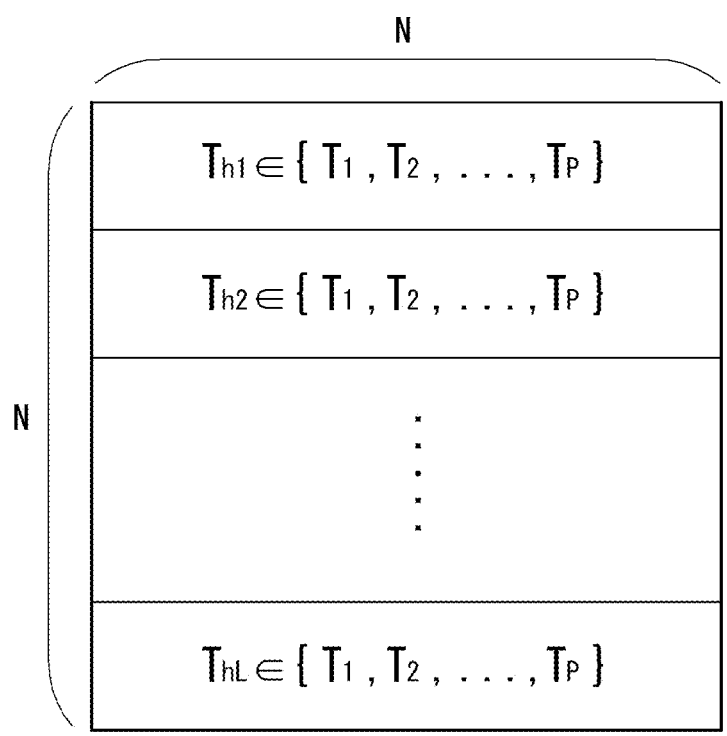

[FIG. 19]
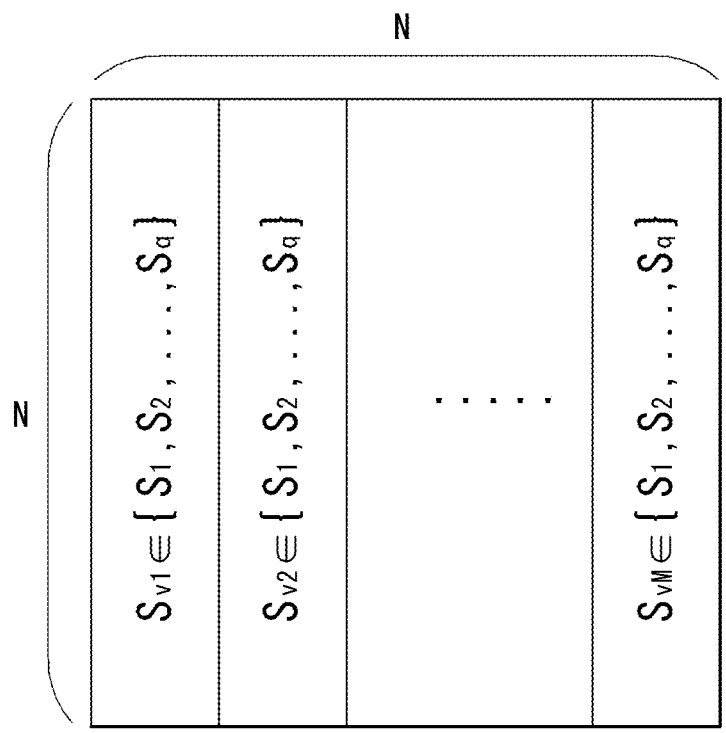
[FIG. 20]
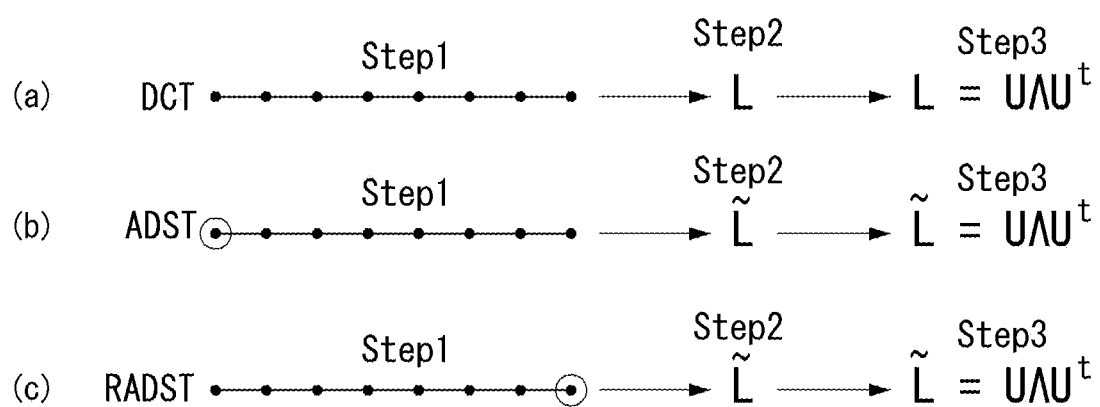

[FIG. 21]
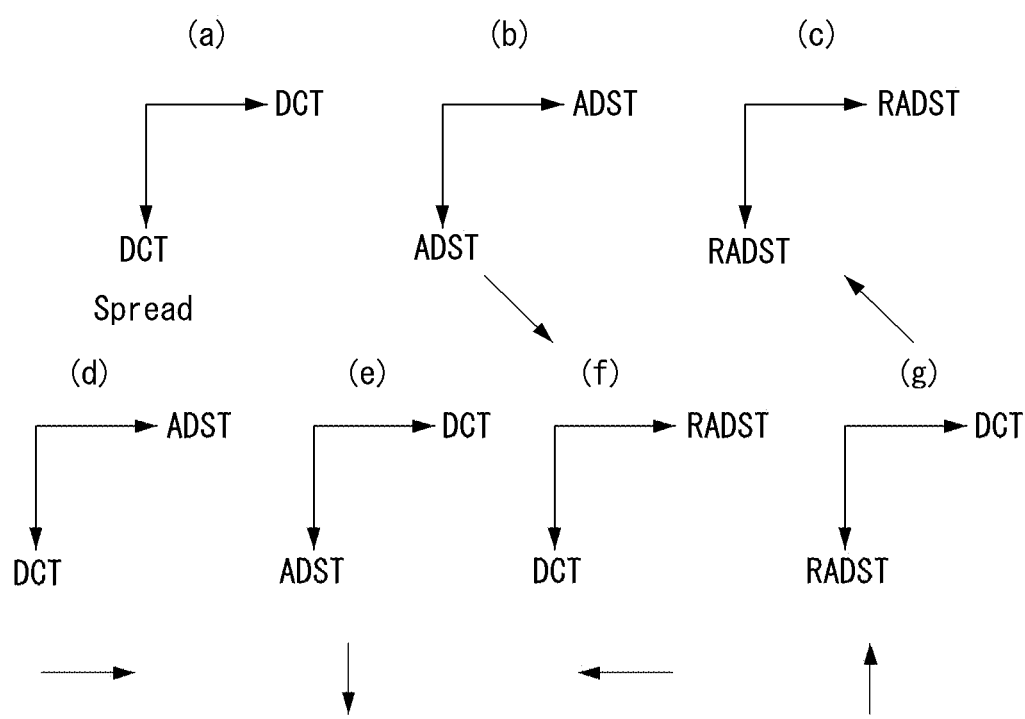

[FIG. 22]
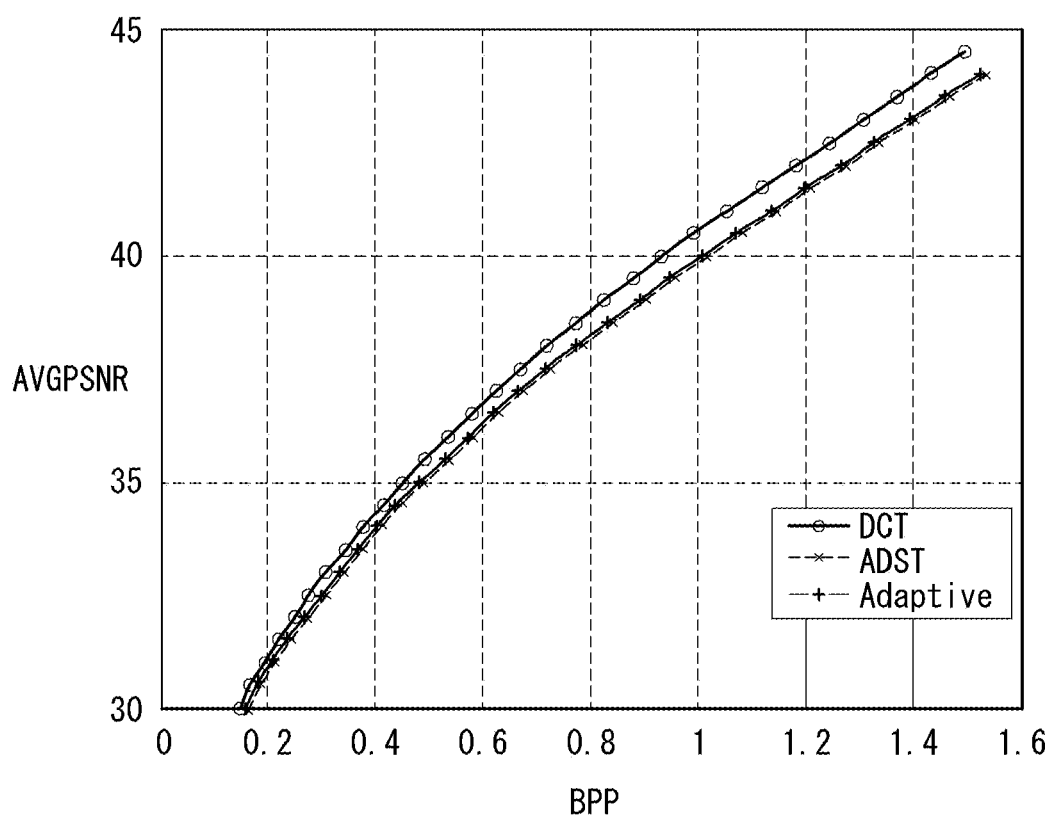

[FIG. 23]
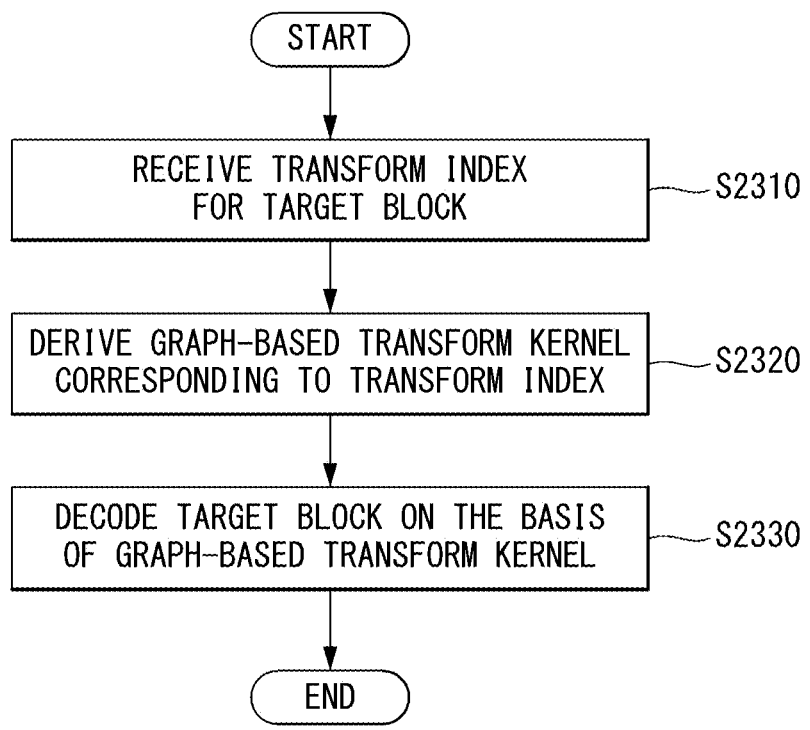

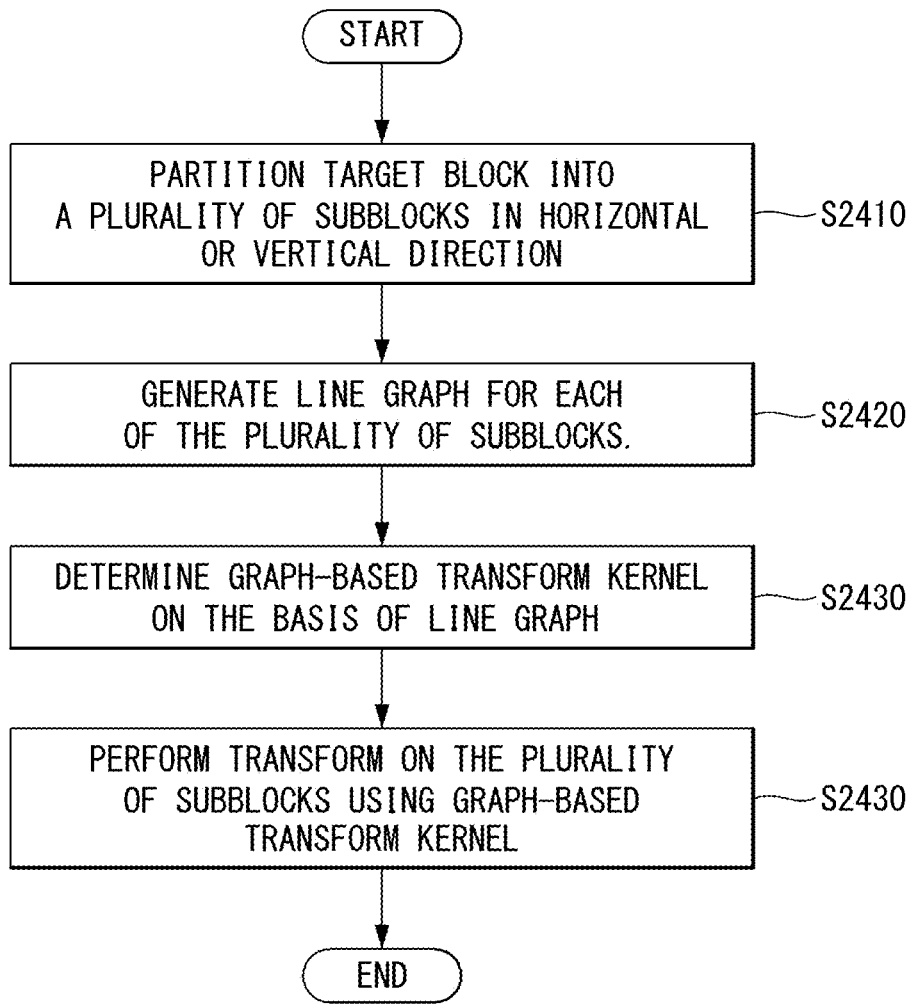
[FIG. 24]

METHOD AND DEVICE FOR PROCESSING A VIDEO SIGNAL BY USING AN ADAPTIVE SEPARABLE GRAPH-BASED TRANSFORM

TECHNICAL FIELD

The present invention relates to a method and device for encoding and decoding a video signal using graph-based transform. More particularly, the present invention relates to a method for applying an adaptive separable graph-based transform according to different characteristics of residual signals.

BACKGROUND ART

A compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression The next generation video contents are supposed to have the characteristics of high spatial resolution, high frame rate and high dimensionality of scene representation. In order to process such contents, drastic increase of memory storage, memory access rate and processing power will be resulted.

Accordingly, it is required to design the coding tool for processing the next generation video contents efficiently.

In particular, a graph is a data expression form advantageous for describing inter-pixel relation information, and a graph-based signal processing scheme of processing inter-pixel relation information by expressing it as a graph has been utilized. In the graph-based signal processing, concepts such as sampling, filtering, conversion, and the like, may be generalized using a graph in which each signal sample indicates a vertex and relations of signals are indicated as graph edges having a positive weight.

In general, a separable discrete cosine transform is used when encoding a residual signal. A major problem of the separable DCT is that the separable DTC is based on an ambiguous assumption that every residual signal has isotropic statistical properties. However, in actuality, residual blocks may have very different statistical properties according to a prediction method and video content. Thus, it is required to enhance compression efficiency using different transform adaptive to statistical properties of residual blocks.

DISCLOSURE

Technical Problem

An aspect of the present invention is to design a generalized separable graph-based transform.

Another aspect of the present invention is to provide a method for applying graph-based transform adaptive to statistical properties of residual blocks.

Another aspect of the present invention is to define generalized separable graph-based transform by combining two 1 D transforms.

Another aspect of the present invention is to provide a method for selecting a line graph based on an edge weight and a self-loop.

Another aspect of the present invention is to provide a method for generating a graph-based transform kernel using various types of line graph.

Another aspect of the present invention is to provide a method for defining a template for graph-based transform and signaling the defined template.

Another aspect of the present invention is to provide a method for applying different separable graph-based transforms to a column direction and a row direction of a coding block.

Technical Solution

According to an aspect of the present invention, a method for applying generalized separable graph-based transform is provided.

According to another aspect of the present invention, a method for applying adaptive graph-based transform to statistical properties of residual blocks is provided.

According to an aspect of the present invention, a method for defining a generalized separable graph-based transform by combining two 1 D transforms is provided.

According to an aspect of the present invention, a method for selecting a line graph based on an edge weight and a self-loop is provided.

According to an aspect of the present invention, a method for generating a graph-based transform kernel using various types of line graph is provided.

According to an aspect of the present invention, a method for defining a template for graph-based transform and signaling the defined template is provided.

According to an aspect of the present invention, a method for applying different separable graph-based transforms with respect to a column direction and a row direction of a coding block is provided.

Advantageous Effects

According to embodiments of the present invention, sufficient diversity in transform allows for rapid adaptation with respect to a change in statistical properties in different video parts. Also, compared with non-separable transform, the proposed transform has low calculation complexity and low overhead in signaling transform selection information.

Also, in the present invention, a video signal may be more effectively processed by applying the generalized separable graph-based transform, and coding may be more effectively performed by applying different separable graph-based transform to a column direction and a row direction of a coding block.

Also, in the present invention, flexibility allowing for adaptively application of transform may be secured, calculation complexity may be reduced, rapid adaptation for statistical properties changing in different video segments may be possible, and variability may be provided in performing transform.

Also, in the present invention, calculation complexity for coding a video signal may be reduced using separable transform and overhead in transmission of a transform matrix and transform selection may be significantly reduced.

Also, in the present invention, since the method for defining a template for graph-based transform and signaling the same is provided, overhead for coding graph information may be significantly reduced.

DESCRIPTION OF DRAWINGS

FIG. 1 shows a schematic block diagram of an encoder for encoding a video signal, in accordance with one embodiment of the present invention.

FIG. 2 shows a schematic block diagram of a decoder for decoding a video signal, in accordance with one embodiment of the present invention.

FIG. 3 shows examples of graphs used for modeling statistical relationships in 8×8 block within a video frame according to an embodiment to which the present invention is applied.

FIG. 4 shows a graph of two shapes representing weights distribution as an embodiment to which the present invention is applied.

FIG. 5 is a diagram for describing a procedure of obtaining a graph-based transform matrix based on 1-dimensional graph and 2-dimensional graph as an embodiment to which the present invention is applied.

FIG. 6 is a view illustrating 1-dimensional graphs which may become transform bases for applying a separable transform according to an embodiment to which the present invention is applied.

FIG. 7 is a view illustrating a method for applying a different separable transform to each line of a 2-dimension graph according to an embodiment to which the present invention is applied.

FIG. 8 is a schematic block diagram of an encoder which processes a graph-based signal according to an embodiment to which the present invention is applied.

FIG. 9 is a schematic block diagram of a decoder which processes a graph-based signal according to an embodiment to which the present invention is applied.

FIG. 10 is an internal block diagram of a graph-based transform unit according to an embodiment to which the present invention is applied.

FIG. 11 is a view illustrating changes in differential pixel values within 8×8 transform blocks according to an intra-prediction mode according to an embodiment to which the present invention is applied.

FIG. 12 is a flow chart illustrating a method for generating generalized separable graph-based transform according to an embodiment to which the present invention is applied.

FIG. 13 is a table illustrating graph types and corresponding transform types according to an embodiment to which the present invention is applied.

FIGS. 14 to 16 are views illustrating transform types based on edge weights and self-loop according to an embodiment to which the present invention is applied.

FIG. 17 is a view illustrating 2-line graphs in a subblock of a N×N intra-angular prediction block according to an embodiment to which the present invention is applied.

FIG. 18 is a view illustrating that L number of transforms are allocated to L number of subblocks in a horizontal direction within a N×N block according to an embodiment to which the present invention is applied.

FIG. 19 is a view illustrating allocation of M number of transforms to M number of subblocks in a vertical direction within a N×N block according to an embodiment to which the present invention is applied.

FIG. 20 is a view illustrating a process of generating transforms based on a graph associated with DCT, asymmetric discrete sine transform (ADST), and reverse asymmetric discrete sine transform (RADST) and a separable graph according to an embodiment to which the present invention is applied.

FIG. 21 is a view illustrating an example of seven separable transforms which can be generated by combining three separable DCT, ADST, and RADST according to an embodiment to which the present invention is applied.

FIG. 22 is a view illustrating a result of comparing average PSNR vs BPP (Bit Per Pixel) regarding a method for adaptively selecting different transforms, compared with fixed DCT and ADST according to an embodiment to which the present invention is applied.

FIG. 23 is a flow chart illustrating a method for deriving a separable graph-based transform kernel using a transform index according to an embodiment to which the present invention is applied.

FIG. 24 is a flow chart illustrating a method for determining a generalized separable graph-based transform kernel according to an embodiment to which the present invention is applied.

BEST MODES

The present invention provides a method for decoding a video signal using adaptive separable graph-based transform, including: receiving, from the video signal, a transform index for a target block, the transform index indicating graph-based transform to be applied to the target block; deriving a graph-based transform kernel corresponding to the transform index; and decoding the target block based on the graph-based transform kernel.

In the present invention, when the target block is comprised of M or N subblocks partitioned in a horizontal or vertical direction, the transform index may correspond to each subblock.

In the present invention, the graph-based transform kernel may be derived to each subblock according to the transform index, and different transform types may be applied to at least two subblocks.

In the present invention, the different transform types may include at least two of DCT, asymmetric discrete sine transform (ADST), and reverse asymmetric discrete sine transform (RADST).

In the present invention, the graph-based transform kernel may be a 2-dimensional separable graph-based transform kernel generated based on a combination of a plurality of 1-dimensional graph-based transforms.

In the present invention, the graph-based transform kernel may be predefined in each column or row of the target block.

In the present invention, the transform index may be received in every unit of at least one of a coding unit, a prediction unit, and a transform unit.

The present invention also provides a method for encoding a video signal using adaptive separable graph-based transform, including: partitioning a target block into a plurality of subblocks in a horizontal or vertical direction; generating a line graph for each of the plurality of subblocks; determining a graph-based transform kernel based on the line graph; and performing transform on the plurality of subblocks using the graph-based transform kernel.

In the present invention, the method may further include: encoding a transform index corresponding to the graph-based transform kernel, wherein the transform index may correspond to each subblock.

In the present invention, the graph-based transform kernel may represent a 2-dimensional separable graph-based transform kernel, and the graph-based transform kernel may be generated based on a combination of a plurality of 1-dimensional graph-based transforms respectively corresponding to the line graphs.

The present invention also provides a device for decoding a video signal using adaptive separable graph-based transform, including: a parsing unit receiving, from the video signal, a transform index for a target block; and an inverse-transform unit deriving a graph-based transform kernel corresponding to the transform index and decoding the target block based on the graph-based transform kernel, wherein when the target block is comprised of a plurality of subblocks partitioned in a horizontal or vertical direction, the transform index may correspond to each subblock, the graph-based transform kernel may be derived to each subblock according to the transform index, and different transform types may be applied to at least two subblocks.

The present invention also provides a device for encoding a video signal using adaptive separable graph-based transform, including: an image partitioning unit partitioning a target block into a plurality of subblocks in a horizontal or vertical direction; and a graph-based transform unit generating a line graph for each of the plurality of subblocks, determining a graph-based transform kernel based on the line graph, and performing transform on the plurality of subblocks using the graph-based transform kernel, wherein different transform types may be applied to at least two of the plurality of subblocks.

Mode for Invention

Hereinafter, exemplary elements and operations in accordance with embodiments of the present invention are described with reference to the accompanying drawings, however, it is to be noted that the elements and operations of the present invention described with reference to the drawings are provided as only embodiments and the technical spirit and kernel configuration and operation of the present invention are not limited thereto.

Furthermore, terms used in this specification are common terms that are Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process. Furthermore, partitioning, decomposition, splitting, division may also be properly replaced and interpreted in each coding process.

By applying a linear transform that adaptively modifies the statistical properties of a signal in different parts of a video sequence, compression efficiency may be improved. General statistical methods have been tried such an object, but they bring a restricted result. The present invention introduces a graph-based signal processing technique as a more efficient method for modeling statistical properties of a video signal for video compression.

In order to simplify mathematical analysis and to use the result known from a graph theory, most of applications developed for the graph-based signal processing uses an undirected graph without self-loop (i.e., there is no edge that connects nodes in itself), and models with non-negative edge only in each graph edge.

Such an approach may be successfully applied for signaling an image of well defined discontinuity, sharp edge or a depth image. The graphs corresponding to $N^2$ pixel blocks in an image and video application require transmission overhead for $2N^2$ or $4N^2$ non-negative edge weights, generally. After a graph is defined, the orthogonal transform for coding or prediction may be derived by calculating spectral decomposition of a graph Laplacian matrix. For example, through the spectral decomposition, an eigenvector and an eigen value may be obtained.

The present invention provides a new method for modifying the procedure of calculating a graph-based transform using new generalization of the conventional spectral decomposition. Here, the transform obtained from a graph signal may be defined as Graph-Based Transform (hereinafter, GBT). For example, when the relation information between pixels constructing a TU is represented in a graph, the transform obtained from the graph may be referred to as GBT.

The general form of the spectral decomposition to which the present invention is applied may be obtained based on an additional set of graph edge parameters that have desired properties and graph vertex parameters. Through such an embodiment of the present invention, the transform properties may be well controlled, and the problem of sharp discontinuities of the vectors defining transform may be avoided. Hereinafter, the embodiments to which the present invention will be described in detail.

FIG. 1 shows a schematic block diagram of an encoder for encoding a video signal, in accordance with one embodiment of the present invention.

Referring to FIG. 1, an encoder 100 may include an image segmentation unit 110, a transform unit 120, a quantization unit 130, an inverse quantization unit 140, an inverse transform unit 150, a filtering unit 160, a DPB (Decoded Picture Buffer) 170, an inter-prediction unit 180, an intra-prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure. The present invention is not limited to the definitions of the terms. In this specification, for convenience of illustration, the term "coding unit" is employed as a unit used in a process of encoding or decoding a video signal. However, the present invention is not limited thereto. Another process unit may be appropriately selected based on contents of the present disclosure.

The encoder 100 may generate a residual signal by subtracting a prediction signal output from the inter-prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as bitstreams.

The quantized signal output from the quantization unit 130 may be used to generate a prediction signal. For example, the quantized signal may be subjected to an inverse quantization and an inverse transform via the inverse quantization unit 140 and the inverse transform unit 150 in the loop respectively to reconstruct a residual signal. The reconstructed residual signal may be added to the prediction signal output from the inter-prediction unit 180 or intra-prediction unit 185 to generate a reconstructed signal.

On the other hand, in the compression process, adjacent blocks may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter-prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter-prediction unit 180.

The inter-prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization on a block basis in the previous encoding/decoding. Thus, this may result in blocking artifacts or ringing artifacts.

Accordingly, in order to solve the performance degradation due to the discontinuity or quantization of the signal, the inter-prediction unit 180 may interpolate signals between pixels on a subpixel basis using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter may be applied to the reconstructed picture to improve the accuracy of the prediction. For example, the inter-prediction unit 180 may apply the interpolation filter to integer pixels to generate interpolated pixels. The inter-prediction unit 180 may perform prediction using an interpolated block composed of the interpolated pixels as a prediction block.

The intra-prediction unit 185 may predict a current block by referring to samples in the vicinity of a block to be encoded currently. The intra-prediction unit 185 may perform a following procedure to perform intra prediction. First, the intra-prediction unit 185 may prepare reference samples needed to generate a prediction signal. Then, the intra-prediction unit 185 may generate the prediction signal using the prepared reference samples. Thereafter, the intra-prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction The prediction signal generated via the inter-prediction unit 180 or the intra-prediction unit 185 may be used to generate the reconstructed signal or used to generate the residual signal.

FIG. 2 shows a schematic block diagram of a decoder for decoding a video signal, in accordance with one embodiment of the present invention.

Referring to FIG. 2, a decoder 200 may include a parsing unit (not shown), an entropy-decoding unit 210, an inverse quantization unit 220, an inverse transform unit 230, a filtering unit 240, a decoded picture buffer (DPB) 250, an inter-prediction unit 260 and an intra-prediction unit 265.

A reconstructed video signal output from the decoder 200 may be reproduced using a reproducing device.

The decoder 200 may receive the signal output from the encoder as shown in FIG. 1. The received signal may be entropy-decoded via the entropy-decoding unit 210.

The inverse quantization unit 220 may obtain a transform coefficient from the entropy-decoded signal using quantization step size information. In this case, the obtained transform coefficient may be associated with the operations of the transform unit 120 as described above with reference to FIG. 1.

The inverse transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter-prediction unit 260.

Herein, detailed descriptions for the filtering unit 160, the inter-prediction unit 180 and the intra-prediction unit 185 of the encoder 100 may be equally applied to the filtering unit 240, the inter-prediction unit 260 and the intra-prediction unit 265 of the decoder 200 respectively.

FIG. 3 shows examples of graphs used for modeling statistical relationships in 8×8 block within a video frame according to an embodiment to which the present invention is applied.

The discrete-time signal processing technique has been developed from directly processing and filtering an analogue signal, and accordingly, has been restricted by a few common assumptions such as sampling and processing regularly organized data only.

Basically, the video compression field is based on the same assumption, but has been generalized for a multi-dimensional signal. The signal processing based on a graph representation generalizes the concepts such as sampling, filtering and Fourier transform, uses the graph that represents a vertex by each signal sample, and is started from the conventional approach in which signal relationships are represented by graph edges with positive weights. This completely isolates a signal from its acquisition process, and accordingly, the properties such as sampling rate and sequence are completely replaced by the properties of a graph. Accordingly, the graph representation may be defined by a few specific graph models.

In the present invention, an undirected simple graph and an undirected edge may be used to represent an empirical connection between data values. Here, the undirected simple graph may mean a graph without self-loop or multiple edges.

When the undirected simple graph that has a weight allocated for each edge is referred to as G, the undirected simple graph G may be described with triplet as represented in Equation 1.

$$G=\{V,\varepsilon,W\} \quad \text{[Equation 1]}$$

Here, V represents V numbers of graph vertex set, ε represents a graph edge set, and W represents a weight represented as V×V matrix. Here, weight W may be represented as Equation 2 below.

$$Wi,j=Wj,i\geq 0 \quad \text{[Equation 2]}$$

$W_{i,j}$ represents a weight of edge (i, j), and $W_{j,i}$ represents a weight of edge (j, i). When there is no edge connecting vertex (i, j), $W_{i,j}$=0. For example, in the case of assuming that there is no self-loop, $W_{i,i}$=0, always.

The representation is partially overlapped for a special case of the undirected simple graphs that have an edge weight. This is because matrix W includes all types of information of the graph. Accordingly, in the present invention, hereinafter, a graph is represented as G(W).

Meanwhile, referring to FIG. 3, the present invention provides two embodiments of graph types that may be used for processing 8×8 pixel blocks in an image or a video. Each pixel is in relation to a graph vertex, and the pixel value becomes the value of the graph vertex.

A graph edge may mean a line connecting graph vertexes. The graph edge is used for representing a certain type of statistical dependency within a signal, and in this case, a positive weight may represent the sharpness. For example, each vertex may be connected to all of other vertexes, and weight of 0 may be allocated to an edge that connects vertexes not coupled with each other or weakly coupled. However, for simplifying the representation, the edge having the weight of 0 may be completely removed.

In the graph shown in FIG. 3(a), a graph edge may be defined such that each vertex is connected to the nearest 4 adjacent vertexes. However, a block edge may be differently treated. In addition, in the graph shown in FIG. 3(b), it may be defined that each vertex is connected to the nearest 8 adjacent vertexes.

FIG. 4 shows a graph of two shapes representing weights distribution as an embodiment to which the present invention is applied.

The vertex value of a graph is an independent variable based on a signal measurement (normally, modeled as an arbitrary variable), but it is required to select an edge weight in accordance with the property of a part of signal. FIG. 4 shows two exemplary graphs that represent the edge weights of different lines for a graph edge. For example, the bold lines may represent the weight of w=1, and the fine lines may represent the weight of w=0.2.

The graph shown in FIG. 4(a) represents the case of having "weak link" along a straight line, and represents the case of having two types of edge weights only. Here, the "weak link" means having relatively small edge weight.

This is commonly used in a graph-based image processing actually, and such a construction may represent a difference between an edge in an image and a pixel statistics between different sides.

FIG. 4(b) represents a distribution of an edge weight that covers irregular area. The present invention is to provide a method for processing a signal using such a distribution graph of an edge weight.

FIG. 5 is a diagram for describing a procedure of obtaining a graph-based transform matrix based on 1-dimensional graph and 2-dimensional graph as an embodiment to which the present invention is applied.

As an embodiment of the present invention, the graph type that may be used for processing a pixel block in an image may be described using FIG. 5. For example, FIG. 5(a) shows 1-dimensional graph that corresponds to each line in the pixel block, and FIG. 5(b) shows 2-dimensional graph that corresponds to the pixel block.

A graph vertex is in relation to each pixel of the pixel block, and a value of the graph vertex may be represented as a pixel value. And, a graph edge may mean a line connecting the graph vertexes. The graph edge is used for representing a certain type of statistical dependency in a signal, and the value representing its sharpness may be referred to as an edge weight.

For example, FIG. 5(a) shows a 1-dimensional graph, 0, 1, 2 and 3 represents the position of each vertex, and $w_0$, $w_1$ and $w_2$ represent the edge weight between vertexes. FIG. 5(b) shows a 2-dimensional graph, and $a_{ij}$ (i=0, 1, 2, 3, j=0, 1, 2) and $b_{kl}$ (k=0, 1, 2, l=0, 1, 2, 3) represent the edge weight between vertexes.

Each vertex may be connected to all of other vertexes, and weight of 0 may be allocated to an edge that connects vertexes not coupled with each other or weakly coupled. However, for simplifying the representation, the edge having the weight of 0 may be completely removed.

The relationship information between pixels may be represented as whether there is an edge between pixels and an edge weight when each pixel is mapped to a vertex of a graph.

In this case, GBT may be obtained through the following procedures. For example, an encoder or a decoder may obtain graph information from a target block of a video signal. From the obtained graph information, Laplacian matrix L may be obtained as represented in Equation 3 below.

$$L=D-A \quad \text{[Equation 3]}$$

In Equation 3 above, D represents a degree matrix. For example, the degree matrix may mean a diagonal matrix including the information of a degree of each vertex. A represents an adjacency matrix that represents the interconnection (for example, edge) with an adjacent pixel by a weight.

And, with respect to the Laplacian matrix L, a GBT kernel may be obtained by performing an eigen decomposition as represented in Equation 4 below.

$$L=U\Lambda U^T \quad \text{[Equation 4]}$$

In Equation 4 above, L means a Laplacian matrix L, U means an eigen matrix, and $U^T$ means a transposed matrix of U. In Equation 4, the eigen matrix U may provide a graph-based Fourier transform specialized for a signal suitable for the corresponding model. For example, the eigen matrix U that satisfies Equation 4 may mean a GBT kernel.

FIG. 6 is a view illustrating 1-dimensional (1D) graphs which may become transform bases for applying a separable transform according to an embodiment to which the present invention is applied.

Embodiments regarding 1D graphs which may become a base for one line may be described as follows.

In a first embodiment, correlation regarding one pixel pair is so small that a weight value of a corresponding edge may be set to be small. For example, a pixel pair including a block boundary may have relatively small correlation, so a small edge weight may be set for a graph edge including a block boundary.

In a second embodiment, a self-loop may be present or not at both ends, or self-loop may be present only at one end. For example, FIGS. 6(a) and 6(b) illustrates the case where the self-loop is present only at one of both ends, FIG. 6(c) illustrates the case where the self-loop is present at both ends of the graph, and FIG. 6(d) illustrates the case where the self-loop is not present at both ends of the graph. Here, the self-loop, representing dependency with an adjacent vertex, may refer to self-weight, for example. That is, a weight may be further given to a portion where the self-loop is present.

In another embodiment of the present invention, an extra 1D separable transform set may be defined according to TU sizes. In the case of non-separable transform, transform coefficient data is increased to $O(N^4)$ as a TU size is increased, but in the case of the separable transform, the transform coefficient data is increased to $O(N^2)$. Thus, the following configuration may be formed by combining several 1D separable transforms forming a base.

For example, as a 1D separable transform template, a template in which the self-loop is present on the left as illustrated in FIG. 6(a), a template in which the self-loop is present on the right as illustrated in FIG. 6(b), a template in which the self-loop is present at both ends as illustrated in FIG. 6(c), and a template in which the self-loop is not present on both sides as illustrated in FIG. 6(d), may be provided. When these templates are all available, the four cases may be possible in rows and columns, and thus, template indices for a total of 16 combinations may be defined.

In another embodiment, in case where a partition boundary or an object boundary is present in the middle of a TU, a template index may be signaled and a separate template in which a small weight value is additionally given only to an edge corresponding to a boundary may be applied instead.

FIG. 7 is a view illustrating a method for applying a different separable transform to each line of a 2-dimensional (2D) graph according to an embodiment to which the present invention is applied.

FIG. 7 illustrates 2D graph corresponding to a pixel block, in which a graph vertex is associated with each pixel of the pixel block, and a value of the graph vertex may be expressed as a pixel value. Here, the line connecting the graph vertices refers to a graph edge. As discussed above, the graph edge is used to indicate statistical dependency in a certain form within a signal, and a value indicating strength thereof may be called an edge weight. For example, referring to FIG. 7, a 2D graph is illustrated in which $a_{ij}$ (i=0, 1, 2, 3, j=0, 1, 2), $b_{kl}$ (k=0, 1, 2, l=0, 1, 2, 3) indicate an edge weight between vertices.

In an embodiment to which the present invention is applied, in the case of a 2D graph connecting graph edges only for pixels neighboring in a right angle direction (which may also be called a 4-connected graph), 2D NSGBT (non-separable GBT) may be applied but a 1D SGBT (separable GBT) may be applied to a row direction and a column direction.

For example, since each vertex of the 2D graph of FIG. 7 has a maximum of four neighboring vertices, the graph may be a 4-connected graph, and here, a 2D NSGBT (non-separable GBT) kernel may be generated and applied by using an edge weight ($a_{ij}$, $b_{kl}$) of each side.

In a specific example, in the row direction, 1D SGBT (separable GBT) for the graph including edge weights of $a_{i0}$, $a_{i1}$, $a_{i2}$ of an ith row is applied to each column, and regarding each column, 1D SGBT (separable GBT) regarding a graph including edge weights of $b_{0j}$, $b_{1j}$, $b_{2j}$ of a jth column may be applied to each row.

In another example, in the case of an arbitrary 4-connected graph, different 1D SGBT (separable GBT) may be applied to each line (in both a horizontal direction and a vertical direction). For example, in case where combinations of edge weights for each of column and row are different in FIG. 7, 1D SGBT for each combination may be applied.

Meanwhile, in case where a GBT template set for a N×N TU includes M number of 4-connected graphs, a total of M number of $N^2 \times N^2$ transform matrices should be prepared, increasing a memory demand for storing the transform matrices. Thus, if one 4-connected graph can be combined to at least one 1D graph element so as to be configured, only transform for the at least one 1D graph element is required, and thus, a memory amount for storing the transform matrices may be reduced.

In an embodiment of the present invention, various 4-connected 2D graphs may be generated by a limited number of 1D graph elements, whereby a GBT template set appropriate for each mode combination may be customized. Although a total number of GBT templates is increased, the number of 1D transforms forming the base may remain as is, and thus, a required amount of memory may be minimized. For example, combinations of a limited number of ($a_{i0}$, $a_{i1}$, $a_{i2}$) and ($b_{0j}$, $b_{1j}$, $b_{2j}$) may be prepared and appropriately connected in units of 1D graphs for each combination to generate one 4-connected 2D graph.

For example, regarding a current coding block, if graph edge information, partition information, inter-pixel correlation information, and the like, can be received from a bit stream or derived from surrounding information, combinations of 1D transforms may be customized using these information.

FIG. 8 is a schematic block diagram of an encoder which processes a graph-based signal according to an embodiment to which the present invention is applied.

Referring to FIG. 8, an encoder 800 to which the present invention is applied includes a graph-based transform unit 810, a quantization unit 820, a transform-quantization unit 830, an inverse-transform unit 840, a buffer 850, a prediction unit 860, and an entropy-encoding unit 870.

The encoder 800 receives a video signal and subtracts a predicted signal output from the prediction unit 860 from the video signal to generate a prediction error. The generated prediction error is transmitted to the graph-based transform unit 810, and the graph-based transform unit 810 generates a transform coefficient by applying a transform scheme to the prediction error.

In another embodiment to which the present invention is applied, the graph-based transform unit 810 may compare an obtained graph-based transform matrix with the transform matrix obtained from the transform unit 120 of FIG. 1 and select a more appropriate transform matrix.

The quantization unit 820 quantizes the generated transform coefficient and transmits the quantized coefficient to the entropy-encoding unit 820.

The entropy-encoding unit 820 performs entropy encoding on the quantized signal and outputs an entropy-coded signal.

The quantized signal output from the quantization unit 820 may be used to generate a predicted signal. For example, the inverse-quantization unit 830 within the loop of the encoder 800 and the inverse-transform unit 840 may perform inverse-quantization and inverse-transform on the quantized signal such that the quantized signal may be reconstructed to a prediction error. The reconstructed signal may be generated by adding the reconstructed prediction error to the predicted signal output from the prediction unit 860.

The buffer 850 stores a reconstructed signal for a future reference of the prediction unit 860.

The prediction unit 860 may generate a predicted signal using a signal which was previously reconstructed and stored in the buffer 850. The generated predicted signal is subtracted from the original video signal to generate a residual signal, and the residual signal is transmitted to the graph-based transform unit 810.

FIG. 9 is a schematic block diagram of a decoder which processes a graph-based signal according to an embodiment to which the present invention is applied.

A decoder 900 of FIG. 9 receives a signal output from the encoder 800 of FIG. 8.

An entropy decoding unit 910 performs entropy-decoding on a received signal. The inverse-quantization unit 920 obtains a transform coefficient from the entropy-decoded signal based on a quantization step size.

The inverse-transform unit 930 performs inverse-transform on a transform coefficient to obtain a residual signal. Here, the inverse-transform may refer to inverse-transform for graph-based transform obtained from the encoder 800.

The obtained residual signal may be added to the predicted signal output from the prediction unit 950 to generate a reconstructed signal.

The buffer 940 may store the reconstructed signal for future reference of the prediction unit 950.

The prediction unit 950 may generate a predicted signal based on a signal which was previously reconstructed and stored in the buffer 940.

FIG. 10 is an internal block diagram of a graph-based transform unit according to an embodiment to which the present invention is applied.

Referring to FIG. 10, the graph-based transform unit 810 may include a graph parameter determining unit 811, a graph signal generating unit 813, a transform matrix determining unit 815, and a transform performing unit 817.

The graph parameter determining unit 811 may extract a graph parameter of a graph corresponding to a target unit of a video signal or a residual signal. For example, the graph parameter may include at least one of a vertex parameter and an edge parameter. The vertex parameter may include at least one of a vertex position and the number of vertices, and the edge parameter may include at least one of an edge weight value and the number of edge weights. Also, the graph parameter may be defined to a predetermined number of sets.

According to an embodiment of the present invention, a graph parameter extracted from the graph parameter determining unit 811 may be expressed as a generalized form.

The graph signal generating unit 813 may generate a graph signal based on a graph parameter extracted from the graph parameter determining unit 811. Here, the graph signal may include a line graph to which a weight is applied or a weight is not applied. The line graph may be generated for each of a row or column of a target block.

The transform matrix determining unit 815 may determine a transform matrix appropriate for the graph signal. For example, the transform matrix may be determined based on rate distortion (RD) performance. Also, in this disclosure, the transform matrix may be replaced with an expression of transform or a transform kernel so as to be used.

In an embodiment of the present invention, the transform matrix may be a value already determined in the encoder or the decoder, and here, the transform matrix determining unit 815 may be derived from a place where the transform matrix appropriate for the graph signal is stored.

In another embodiment of the present invention, the transform matrix determining unit 815 may generate a 1D transform kernel for a line graph, and generate a 2D separable graph-based transform kernel by combining two of 1D transform kernels. The transform matrix determining unit 815 may determine a transform kernel appropriate for the graph signal among the 2D separable graph-based transform kernels based on the RD performance.

The transform performing unit 817 may perform transform using the transform matrix obtained from the transform matrix determining unit 815.

In this disclosure, functions are sub-divided and described to describe a process of performing graph-based transform, but the present invention is not limited thereto. For example, the graph-based transform unit 810 may include a graph signal generating unit and a transform unit, and here, a function of the graph parameter determining unit 811 may be performed in the graph signal generating unit, and functions of the transform matrix determining unit 815 and the transform performing unit 817 may be performed in the transform unit. Also, a function of the transform unit may be divided into a transform matrix determining unit and a transform performing unit.

FIG. 11 is a view illustrating changes in differential pixel values within 8×8 transform blocks according to an intra-prediction mode according to an embodiment to which the present invention is applied.

An embodiment of the present invention defines a generalized separable transform coupling two 1D transforms, and one of the two 1D transforms may be applied to each column of a residual block and the other may be applied to each row. For example, a separable 2D DCT and a hybrid ADST/DCT separable transforms may correspond to a specific embodiment of the present invention.

A major problem in the case of using the fixed separable transform (e.g., DCT) is an ambiguous assumption that every residual block has the same isotropic statistical properties. However, as illustrated in FIGS. 11(a) to 11(d), in actuality, differential pixel values have different distributions according to prediction methods (or prediction modes). For example, FIG. 11(a) illustrates a change in differential pixel values within a 8×8 transform block in the case of an intra-prediction planar mode, and FIGS. 11(b) to 11(c) illustrate changes in differential pixel values within the 8×8 transform block in the case of intra-prediction direction modes 1, 3, and 7.

In another example, residual blocks may have different distributions according to characteristics of a video image, and here, a video image different from that of FIG. 11 may have a distribution different from the changes in the differential pixel values of FIG. 11.

Thus, in order to solve the problem, the present disclosure proposes a generalized separable transform. For example, the present invention proposes a method for designing 1D transforms used for generating a 2D separable transform, and this will be described in detail in the following embodiments.

FIG. 12 is a flow chart illustrating a method for generating generalized separable graph-based transform according to an embodiment to which the present invention is applied.

An embodiment of the present invention may have the following steps to generate a generalized separable transform.

First, the encoder may generate or design a line graph (S1210). Here, a weight may be applied to the line graph or not.

The encoder may generate a 1D graph-based transform (GBT) associated with the line graph (S1220). Here, the 1D graph-based transform (GBT) may be generated using a generalized Laplacian operator.

Here, when it is assumed that an adjacent matrix A and a graph G(A) defined by the adjacent matrix A are present, a generalized Laplacian matrix $\tilde{L}$ may be obtained through Equation 5 below.

$$\tilde{L}=D-A+S \quad \text{[Equation 5]}$$

In Equation 5, D denotes a degree matrix and, for example, the degree matrix may refer to a diagonal matrix including information regarding a degree of each vertex. A denotes an adjacency matrix indicating a connection relation (e.g., edge) with an adjacent pixel, as a weight. S denotes a diagonal matrix indicating a weighted self-loop in nodes of G.

Also, a GBT kernel may be obtained by perform eigen decomposition on the generalized Laplacian matrix L as expressed by Equation 6 below.

$$\tilde{L}=U \Lambda U^t \quad \text{[Equation 6]}$$

In Equation 6, L denotes a generalized Laplacian matrix, U denotes a eigen matrix, and $U^t$ denotes a transpose matrix. In Equation 6, the eigen matrix U may provide a graph-based Fourier transform specified for a signal appropriate for a corresponding graph model. For example, the eigen matrix U satisfying Equation 6 may refer to a GBT kernel.

Here, columns of the eigen matrix U may refer to basis vectors of the GBT. When a graph does not have a self-loop, the generalized Laplacian matrix may be expressed by Equation 3.

Meanwhile, the encoder may select two 1D graph-based transforms to be used for generating a 2D separable graph-based transform (GBT) (S1230).

Also, the encoder may combine the two selected 1D graph-based transforms to generate a 2D separable graph-based transform (S1240).

In an embodiment of the present invention, K number of 2D separable graph-based transforms may be generated through various combinations of the 1D graph-based transforms, and here, K may be determined in consideration of transform signaling overhead (e.g., a rate-distortion tradeoff).

FIG. 13 is a table illustrating graph types and corresponding transform types according to an embodiment to which the present invention is applied.

An embodiment of the present invention provides a method for generating various types of transform by designing weight information of a graph signal. Here, the weight information of the graph signal may include at least one of an edge weight and a self-loop weight.

The edge weight may include at least one of a uniform edge weight, a non-uniform edge weight, and an arbitrary edge weight. Also, the self-loop weight may include at least one of a no self-loop, a single self-loop at one end, each single self-loop at both ends, and an arbitrary self-loop.

Also, another embodiment of the present invention provides a method for generating various types of transform according to graph types. Here, the graph types may include at least one of a line graph and an arbitrary graph.

For example, in case where a graph line is a line graph, a 1D separable transform may be generated. Also, when a graph type is an arbitrary graph, a non-separable transform may be generated.

FIGS. 13(a) to 13(d) illustrate specific embodiments.

Referring to FIG. 13(a), when a graph type is a line graph, an edge weight is uniform, and there is no self-loop weight, a resulting transform may refer to a separable DCT.

Referring to FIG. 13(b), when a graph type is a line graph, an edge weight is uniform, and single self-loop is at one end, a resulting transform may refer to a separable ADST.

Referring to FIG. 13(c), when a graph type is a line graph, an edge weight is an arbitrary edge weight, and an arbitrary self-loop weight is present, a resulting transform may refer to a generalized separable transform.

Referring to FIG. 13(d), when a graph is an arbitrary graph, an edge weight is an arbitrary edge weight, and an arbitrary self-loop weight is present, a resulting transform may refer to a non-separable transform.

The present invention may generate various types of transform based on at least one of the graph type, the edge weight, and the self-loop weight. For example, a generalized separable transform may be designed by selecting a line graph having different edge weights and self-loop weights.

Accordingly, an adaptive transform may be generated for blocks having different signal characteristics, and coding efficiency may be enhanced by performing transform using the generated adaptive transforms.

FIGS. 14 to 16 are views illustrating transform types based on edge weights and self-loop according to an embodiment to which the present invention is applied.

FIG. 14(a) illustrates a uniformly weighted line graph with 8 nodes, and FIG. 14(b) illustrates a separable extension of 1D GBT derived from the line graph of FIG. 14(a). Referring to FIG. 14(b), it can be seen that it is the same as the 2D separable DCT.

FIG. 15(a) illustrates a uniformly weighted line graph with a self-loop at one end, and FIG. 15(b) illustrates a separable extension of 1D GBT derived from the line graph of FIG. 15(a). Referring to FIG. 15(b), it can be seen that it is the same as the 2D separable ADST.

FIG. 16(a) illustrates a line graph that generates a 1D DCT, FIG. 16(b) illustrates a weighted line graph with no self-loop, and FIG. 16(c) illustrates a 2D separable transform combining the line graphs of FIGS. 16(a) and 16(b). Here, the line graphs of FIGS. 16(a) and 16(b) may be applied to columns and rows of a block so as to be combined.

FIG. 17 is a view illustrating 2-line graphs in a subblock of a N×N intra-angular prediction block according to an embodiment to which the present invention is applied.

In an embodiment of the present invention, 2D non-separable transforms may be obtained using arbitrary graphs connecting some line graphs.

For example, referring to FIG. 17, 2D non-separable transforms derived from a graph connecting pixels of two lines may be applied to a neighboring pair of two rows or columns within a N×N block.

FIG. 17 illustrates 2-line graphs in a subblock within a N×N intra-angular prediction block, and in the case of an intra angular prediction mode, it is predicted that pixels positioned in the same prediction direction are significantly related to each other, and thus, an edge weight may be given along the corresponding pixels as illustrated in FIG. 17.

FIGS. 18 and 19 illustrated embodiments to which the present invention is applied. FIG. 18 is a view illustrating allocation of L number of transforms to L number of subblocks in a horizontal direction within a N×N block according to an embodiment to which the present invention is applied, and FIG. 19 is a view illustrating that M number of transforms are allocated to M number of subblocks in a vertical direction within a N×N block according to an embodiment to which the present invention is applied.

According to the present disclosure, two transform sets may be generated in a vertical direction and in a horizontal direction.

Referring to FIG. 18, a N×N block may be partitioned into L number of subblocks in a horizontal direction. Here, each of the L number of subblocks may have a graph having m lines and L indicates the number of partitions and may be calculated by N/m.

Referring to FIG. 19, the N×N block may be partitioned into M number of subblocks in a vertical direction. Here, each of the M number of subblocks may have a graph having n lines and M may indicate the number of partitions and may be calculated by N/n.

A pixel size of subblocks may be m×N and N×n in horizontal and vertical directions, and here, m and n indicate the number of lines in the horizontal and vertical directions and N indicates a block width.

Here, transform may be performed within each subblock. Also, when m or n is set to 1, transform is the same as that derived from a line graph.

In an embodiment of the present invention, transform may be performed in both directions, and in this case, transform may be performed according to the other remaining one after one of FIG. 18 or 19.

Referring to FIGS. 18 and 19, each subblock may have p or q number of transform kernels derived from each of various types of line graph for a horizontal or vertical direction. For example, in the case of FIG. 18, N number of subblocks may have p number of transform kernels $\{T_1, T_2, \ldots, T_p\}$, and in the case of FIG. 19, M number of subblocks may have q number of transform kernels $\{S_1, S_2, \ldots, S_q\}$.

In an embodiment of the present invention, transform kernels or a transform kernel set derived from various types of line graph may be a predetermined value, and in this case, the encoder and the decoder may already know the value.

In another embodiment, in case where transform kernels (or transform kernel set) in one direction are a predetermined value and the encoder and the decoder already knows the value, transform kernels (or transform kernel set) in the other remaining directions may be defined by an index. In this case, the encoder may signal the index and transmit the index to the decoder.

In another embodiment, transforms for columns or transforms for rows may be different to each other. In this case, all of indices for the transforms for the columns and transforms for the rows may be defined and signaled. Or, indices for a preset combination may be signaled. For example, in the case of FIG. 18, $\{h1, h2, \ldots, hL\}$ indices may be signaled, or in the case of FIG. 19, $\{v1, v2, \ldots, vM\}$ indices may be signaled.

FIG. 20 is a view illustrating a process of generating transforms based on a graph associated with DCT, asymmetric discrete sine transform (ADST), and reverse asymmetric discrete sine transform (RADST) and a separable graph according to an embodiment to which the present invention is applied.

In the present invention, a separable transform may be generalized by using different transforms on rows and columns of a target block.

First, the encoder may generate or design a line graph (Step 1) and subsequently calculate a generalized graph Laplacian (Step 2). Also, the encoder may generate a graph-based transform (GBT) by an eigen decomposition from the generalized graph Laplacian (Step 3).

Referring to FIGS. 20(a) to 20(c), a process of generating a separable graph-based transform by applying the foregoing steps to DCT, ADST, and TADST is illustrated.

In this case, the DCT and ADST correspond to a special embodiment of the graph-based transform (GBT) and the RADST also follows a graph-based interpretation.

The transforms illustrated in FIG. 20 may be further generalized by selecting different link weights, instead of using the same link weight.

In an embodiment of the present invention, in order to extract other features of a residual signal, a combination of three transforms may be used to transform rows and columns of a residual block.

In another embodiment, a template index may be designated for the three transforms or the combination thereof, and in this case, the template index may be transmitted in units of coding unit or prediction unit. Or, a frequently-used transform may be indexed by 0 and other remaining may be indexed by other values.

FIG. 21 is a view illustrating an example of seven separable transforms which can be generated by combining three separable DCT, ADST, and RADST according to an embodiment to which the present invention is applied.

Referring to FIG. 21, DCT, ADST, and TADST pairs may create seven different 2D separable transforms. Here, the arrows present below the embodiments indicate a direction in which energy concentration is increased. However, as illustrated in FIG. 21(a), when energy is spread within a block, DCT is selected, and in this case, the DCT may not have any directionality.

For example, FIG. 21(a) illustrates an example in which a 2D separable transform is generated by a DCT/DCT pair and energy is spread.

FIG. 21(b) illustrates an example in which a 2D separable transform is generated by an ADST/ADST pair and energy concentration is increased in a right downward direction.

FIG. 21(c) illustrates an example in which a 2D separable transform is generated by an RADST/RADST pair and energy concentration is increased in a left upward direction.

FIG. 21(d) illustrates an example in which a 2D separable transform is generated by an ADST/DCT pair and energy concentration is increased in a rightward direction.

FIG. 21(e) illustrates an example in which a 2D separable transform is generated by an DCT/ADST pair and energy concentration is increased in a downward direction.

FIG. 21(f) illustrates an example in which a 2D separable transform is generated by an RADST/DCT pair and energy concentration is increased in a leftward direction.

FIG. 21(g) illustrates an example in which a 2D separable transform is generated by an DCT/RADST pair and energy concentration is increased in an upward direction.

FIG. 22 is a view illustrating a result of comparing average PSNR vs BPP regarding a method for adaptively selecting different transforms, compared with fixed DCT and ADST according to an embodiment to which the present invention is applied.

In this experiment, intra-predicted residual block signals regarding six test sequences were generated. In the encoder, a size of a transform unit is based on quad-tree partitioning within a frame and may be, for example, 4×4, 8×8, 16×16, or 32×32. As illustrated in FIG. 21, in the present invention, seven 2D separable transforms may be generated for each block size. Transform selection may be performed based on rate distortion (RD) performance. In the present invention, performances of adaptively selecting seven different transforms, compared with DCT/ADST, were compared. Average RD performance is the same as that illustrated in FIG. 22, and a corresponding result shows that adaptive selection is superior to the fixed DCT/ADST in terms of RD performance.

FIG. 23 is a flow chart illustrating a method for deriving a separable graph-based transform kernel using a transform index according to an embodiment to which the present invention is applied.

First, the decoder may receive a transform index for a target block from a video signal (S2310). Here, the transform index indicates a graph-based transform to be applied to the target block. Step S2310 may be performed in a parsing unit of the decoder.

In an embodiment of the present invention, in case where the target block includes M number or N number of subblocks partitioned in a horizontal direction or vertical direction, the transform index may correspond to each subblock.

In an embodiment of the present invention, the transform index may be received for each unit of at least one of the coding unit, prediction unit, and transform unit.

The decoder may derive a graph-based transform kernel corresponding to the transform index (S2320). Here, the graph-based transform kernel may be derived in each subblock according to the transform index, and different transform types may be applied to at least two subblocks. For example, the different transform types may include at least two of the DCT, ADST, and RADST.

In an embodiment of the present invention, the graph-based transform kernel may be a 2D separable graph-based transform kernel generated based on a combination of a plurality of 1D graph-based transforms.

In an embodiment of the present invention, the graph-based transform kernel may be predefined for every column or row of the target block. In this case, the encoder and the decoder may already know the graph-based transform kernel and may store the same in a table, for example.

Also, the decoder may decode the target block based on the graph-based transform kernel (S2330).

Steps S2320 and S2330 may be performed in an inverse-transform unit of the decoder.

FIG. 24 is a flow chart illustrating a method for determining a generalized separable graph-based transform kernel according to an embodiment to which the present invention is applied.

First, the encoder may partition a target block into a plurality of subblocks in a horizontal or vertical direction (S2410). Step S2410 may be performed in an image partitioning unit.

The encoder may generate a line graph for each of the plurality of subblocks (S2420).

The encoder may determine a graph-based transform kernel based on the line graph (S2430), and perform transform on the plurality of subblocks using the graph-based transform kernel (S2440). Here, steps S2420 to S2440 may be performed in a graph-based transform unit.

In an embodiment of the present invention, the graph-based transform kernel may indicate a 2D separable graph-based transform kernel, and the graph-based transform kernel may be generated based on a combination of a plurality of 1D graph-based transforms corresponding to the line graph.

In an embodiment of the present invention, the graph-based transform kernel may be predefined in each column or row of the target block. In this case, the encoder and the decoder may already know the graph-based transform kernel and may store the same in a table, for example.

Meanwhile, the encoder may encode a transform index corresponding to the graph-based transform kernel and transmit the same to the decoder. Here, the transform index may correspond to each subblock.

In an embodiment of the present invention, the graph-based transform kernel may be derived for each subblock according to a transform index, and different transform types may be applied to at least two subblocks. For example, the different transform types may include at least two of DCT, ADST, and RADST.

As described above, the embodiments explained in the present invention may be implemented and performed on a processor, a micro-processor, a controller or a chip. For example, functional modules explained in FIG. 1, FIG. 2, FIG. 8, FIG. 9 and FIG. 10 may be implemented and performed on a computer, a processor, a microprocessor, a controller or a chip.

Also, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method for decoding a video signal using an adaptive separable graph-based transform (GBT), the method comprising:
receiving, from the video signal, a transform index for a target block, the transform index indicating GBT to be applied to the target block;
deriving a 2-dimensional (2D) separable GBT kernel corresponding to the transform index; and decoding the target block based on the 2D separable GBT kernel, wherein when the target block is comprised of a plurality of subblocks partitioned in a horizontal or vertical direction, the transform index corresponds to each of the subblocks, wherein the 2D separable GBT kernel is generated based on a combination of at least two 1-dimensional (1D) GBTs, wherein the 1D GBTs are generated for each line graph corresponding to a row direction and a column direction of each of the subblocks, wherein transform types of the 1D GBTs are determined based on graph types of the line graphs, edge weights of the line graphs, and self-loop weights of the line graphs, wherein a direction of energy concentration in the subblocks is determined by a combination of the transform types for each of the row direction and column direction, and wherein the edge weights of the line graphs are given based on prediction direction of the target block.

2. The method of claim 1, wherein
the transform types include at least two of DCT, asymmetric discrete sine transform (ADST), and reverse asymmetric discrete sine transform (RADST).

3. The method of claim 1, wherein
the transform index is received in every unit of at least one of a coding unit, a prediction unit, and a transform unit.

4. A method for encoding a video signal using an adaptive separable graph-based transform (GBT), the method comprising:

partitioning a target block into a plurality of subblocks in a horizontal or vertical direction;

generating a 2-dimensional (2D) separable GBT kernel for each of the plurality of subblocks based on a combination of at least two 1-dimensional (1D) GBTs;

performing a transform on the plurality of subblocks using the 2D separable GBT kernel, and encoding a transform index corresponding to the 2D separable GBT kernel, wherein when the target block is comprised of the plurality of subblocks partitioned in a horizontal or vertical direction, the transform index corresponds to each of the subblocks, wherein the 1D GBTs are generated for each line graph corresponding to a row direction and a column direction of each of the subblocks, wherein transform types of the 1D GBTs are determined based on graph types of the line graphs, edge weights of the line graphs, and self-loop weights of the line graphs, wherein a direction of energy concentration in the subblocks is determined by a combination of the transform types for each of the row direction and column direction, and wherein the edge weights of the line graphs are given based on prediction direction of the target block.

5. The method of claim 4, wherein
the transform types include at least two of DCT, ADST, and RADST.

6. A device for decoding a video signal using an adaptive separable graph-based transform (GBT), the device comprising:

a processor configured to:

receive, from the video signal, a transform index for a target block; and derive a 2-dimensional (2D) separable GBT kernel corresponding to the transform index and decode the target block based on the 2D separable GBT kernel, wherein when the target block is comprised of a plurality of subblocks partitioned in a horizontal or vertical direction, the transform index corresponds to each of the subblocks, wherein when the target block is comprised of a plurality of subblocks partitioned in a horizontal or vertical direction, the transform index corresponds to each of the subblocks, wherein the 2D separable GBT kernel is generated based on a combination of at least two 1-dimensional (1D) GBTs, wherein the 1D GBTs are generated for each line graph corresponding to a row direction and a column direction of each of the subblocks, wherein transform types of the 1D GBTs are determined based on graph types of the line graphs, edge weights of the line graphs, and self-loop weights of the line graphs, wherein a direction of energy concentration in the subblocks is determined by a combination of the transform types for each of the row direction and column direction, and wherein the edge weights of the line graphs are given based on prediction direction of the target block.

7. A device for encoding a video signal using an adaptive separable graph-based transform (GBT), the device comprising:

a processor configured to:

partition a target block into a plurality of subblocks in a horizontal or vertical direction;

generate a 2-dimensional (2D) separable GBT kernel for each of the plurality of subblocks based on a combination of at least two 1-dimensional (1D) GBTs; and perform a transform on the plurality of subblocks using 2D separable GBT kernel, wherein when the target block is comprised of the plurality of subblocks partitioned in a horizontal or vertical direction, a transform index corresponds to each of the subblocks, wherein the 1D GBTs are generated for each line graph corresponding to a row direction and a column direction of each of the subblocks, wherein transform types of the 1D GBTs are determined based on graph types of the line graphs, edge weights of the line graphs, and self-loop weights of the line graphs, wherein a direction of energy concentration in the subblocks is determined by a combination of the transform types for each of the row direction and column direction, and wherein the edge weights of the line graphs are given based on prediction direction of the target block.

* * * * *